April 15, 1952     A. THALMANN     2,593,363
DEVICE FOR THE FULLY AUTOMATIC MACHINING
OF SURFACES OF LEAFLIKE WORKS
Filed July 30, 1947     5 Sheets-Sheet 1

INVENTOR:
Alfred Thalmann
by Sommers & Young
Attorneys

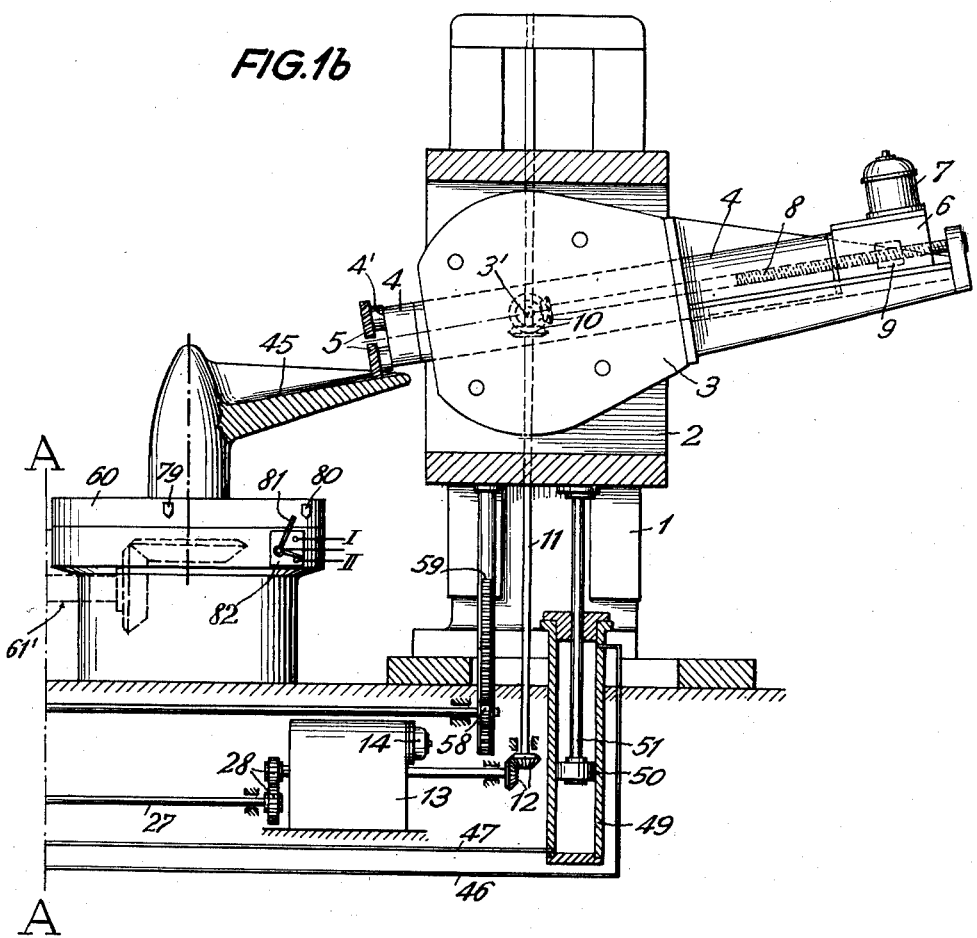

Patented Apr. 15, 1952

2,593,363

UNITED STATES PATENT OFFICE 2,593,363

DEVICE FOR THE FULLY AUTOMATIC MACHINING OF SURFACES OF LEAFLIKE WORKS

Alfred Thalmann, Rorschacherberg, Switzerland, assignor to Starrfrasmaschinen A. G., Rorschacherberg, Switzerland Application July 30, 1947, Serial No. 764,770
In Switzerland August 11, 1943

Section 1, Public Law 690, August 8, 1946
Patent expires August 11, 1963

8 Claims. (Cl. 90—13.7)

This invention relates to a copying machine tool for the automatic machining of the surfaces of blade like work pieces, in which a work piece reciprocates in synchronism with a model and is machined by tool means supported for feed movement longitudinally of the work in conjunction under control of exploring movements of feeler means.

In hitherto known devices serving this purpose blade-like work pieces have been individually machined, in such manner, that first one side of the work and then the other side of the work piece was machined. In so proceeding it was unavoidable that on the completion of the second surface the configuration of the first surface was deformed owing to the setting up of interior stressing and heating of the material. Further, the working time was unnecessarily increased, due to idling losses, for the reason that in consequence of the necessity for traveling in the direction of cutting the work must be returned into initial position after each cutting movement.

These drawbacks are eliminated in the device according to the present invention by providing an individual tool which is supported on a swingable arm the pivot axis of which is stationary relative to the work, so that the length of said arm varies commensurate with the feed movement of the tool while the work reciprocates in horizontal arcuate throws of a length corresponding with the respective width of the work and that by conjoint effect of said two movements all exploring movements performed by the feeler means resulting from any feasible surface configurations are transmitted to the tool, and the model is duplicated on the work fully automatically by successive, complete convolutions transversely of the work.

In consequence of this operation, the upper and lower sides of the flat work pieces are alternately or simultaneously machined so that deformation of either one of the sides of the work is avoided. Furthermore, idling losses can be reduced to a very small percentage by virtue of the continuity of the successive convolutions performed by the tool around the work, with relatively short interruptions of milling at the points of reversal of the tool.

Two embodiments of the device according to the present invention are illustrated by way of example only in the accompanying drawings in which Figs. 1a and 1b show respectively, the left half and right half elevation of the device partially in section according to this invention, in which in a schematic illustration individual parts are drawn to different scale;

Figure 1A:
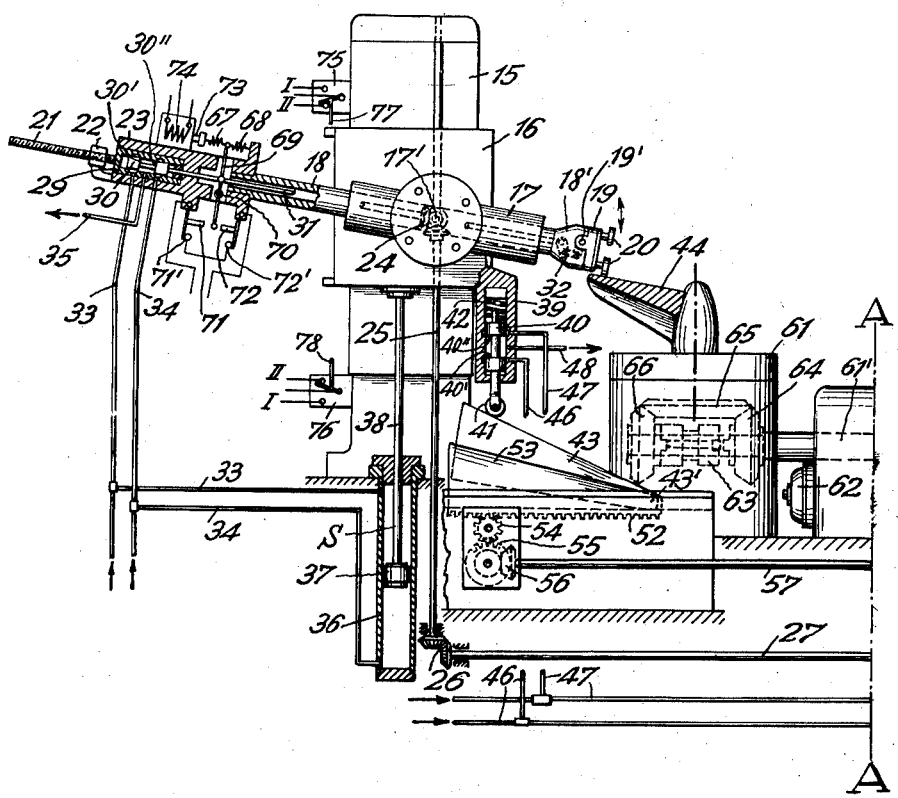

With a view to facilitating the understanding of the general build of the device according to this invention only one standard 1 is shown in Fig. 1b on which the working slide 2 is guided for being slidingly raised and lowered in the vertical direction relatively to the work. The working slide 2 carries a rotatable swivelling head 3 through the pivot axis 3' of which a milling cutter carrier arm 4, hereinafter briefly termed milling arm, is transversely displaceably guided. This milling arm 4 carries at one of its ends two milling cutters 5 which have driving motion imparted thereto by means of a gear box 6 which is mounted on the other end of this arm and is operatively connected with a motor 7. By pivoting the head 3 about its pivot axis 3' the tool can be adjusted into different angular positions to the work. The displacing movement of the milling arm 4 transversely of the pivot axis of the head 3 is effected by means of a traversing screw 8, a screw nut 9 carried by said screw being mounted in a lateral eye bearing on the gear box. The traversing screw 8 has driving movement imparted thereto via a bevel wheel drive 10, an upstanding shaft 11, a pair of bevel wheels 12, and a casing 13 including gearing means, from a motor 14.

Removed from the working standard 1 is arranged a copying standard 15 on a vertical guide of which the copying slide 16 is displaceably mounted. The copying slide 16 carries a rotatable swivelling head 17 in a manner similar to that of the working slide, a feeler arm 18 being guided so as to be displaceable longitudinally of said head, transversely of the pivot axis 17' of the head 17. The feeler arm 18 carries on its front end a feeler head 19 for movement transversely of the pivot axis 17' of the feeler arm. This head supports feeler members or rollers 20, for example, two in number. The feeler arm has imparted the movement transversely of the pivot axis 17' thereto by a traversing screw 21, a screw nut 22 carried by said screw being arranged on a support 23. The traversing screw 21 is driven by the motor 14 by means of a bevel wheel drive 24, an upstanding shaft 25, a pair of bevel wheels 26, a shaft 27, back gears 28 and a mechanism housed in the gear casing 13. From this motor is also derived the driving movement for the adjustment of the milling arm 4.

The control support 23 includes a control cylinder 29 in which is contained a control slide valve 30, in the form of a tandem piston, which is pivotally connected by a rod 31 with the feeler head 19, at 19', by means of a lever system 32. The transmission means is so constructed that any movement of the feeler head 19 results in correspondingly shifting the rod 31, dependent upon the impulse imparted to said means by the feeler head 19, either towards the left or right hand side. Two conduits 33, 34 communicate with the cylinder 29 for supplying pressure fluid to said cylinder, and for returning this fluid from the cylinder a conduit 35 is connected with the latter. The conduits 33, 34 are also connected wih the upper and lower end space S of a copying cylinder 36 which is arranged at the bottom of the copying standard 15. With the cylinder 36 a piston 37 cooperates the guiding shaft 38 of which is firmly connected with the copying slide 16. On one of the side portions of the copying slide a control cylinder 39 is arranged in which a double acting control slide valve 40 is displaceably accommodated. The control slide valve 40 carries on a lower extension thereof a feeler roller 41 and is urged against an obliquely adjustable rule 43 by action of a spring 42.

Connected with the control cylinder 39 are two conduits 46 and 47 for the admission of pressure fluid and a return conduit 48 for the pressure fluid is also connected with this cylinder. The conduits 46, 47 are further connected with the upper and lower end space respectively of a working slide supporting cylinder 49 which is disposed at the bottom of the working standard. The piston 50 contained in this cylinder is firmly connected to the working slide 2 by means of a piston rod 51.

The rule 43 is reciprocably mounted on a guide slide 53 and angularly adjustable about an axis of rotation 43' which slide is provided with a rack bar 52. This adjustment is determined by the multiplication factor between the model and the work. In mesh with the rack bar 52 is a back gear 54 with which cooperates the mating back gear 55 which is connected with a spur gear 58 by means of a bevel gear drive 56 and a shaft 57. The gear 58 cooperates with a rack 59 which is secured to the working slide 2. By these means, the parts 43 and 2 are operatively connected with each other.

As the working slide 2 performs its vertical movement, for example upwardly, driving movement is transmitted by means of the rack 59 being moved along with the slide 2, via the various mechanisms to the guide slide 53, in the horizontal direction from left to right and then to the feeler roller 41 on the control slide 40.

The round work supporting table 60 and the round model supporting table 61 are driven at equal angular velocity by motor 62 by means of a shaft 61'. For permitting of machining, for example, left-handed and right-handed works by means of one and the same model, the direction of rotation of the round model supporting table can be changed over by throwing into mesh a coupling member 63 with one or the other gear 64 and 66 included in a bevel wheel reversing gearing 64, 65, 66.

The feeler rollers 20 carried by the feeler head 19 have applied thereto the requisite contacting pressure for exploring the upper and lower slides that is, the face and the back of the model 44 by action of a spring 67 or a spring 68 respectively upon a contact lever 69 which is rockably arranged in the control support 23 about a pin 70 and pivotally connected with the piston control rod 31. The feeler rollers 20 are thus operatively connected with the control slide 30 and the contact lever 69. Corresponding shifting movements are transmitted to the control rod 31, when the feeler rollers 20 ride up on the model 44 above and below the latter, by the feeler head 19 accordingly influencing this rod by means of the transmission means 32. Further, the contact lever 69 actuates one or the other of two feeler contacts 71 or 72. The electrical circuits that are controlled by the feeler contacts 71 and 72 will be hereinafter described.

The springs 67, 68 engaging with the contact lever 69 are connected on one hand with the control support 23 and on other with a tension magnet 73 which is provided with a magnetizing coil 74. The springs 67 and 68 initiate the operation of controlling the feeler device dependent upon the actuation of the magnet coil 74, by means of the above mentioned movement of the rod 31 and that of the control slide or piston 30. When the rollers 20 ride up on the model, the control piston 30 is controlled by effect of the exploring pressure (tensioning of either of the springs 67 or 68) via the feeler head 19, the transmission means, that is the bell crank lever 32 and the rod 31. The feeler head 19 moves parallel of itself, as guided in the feeler arm 18, perpendicularly to the pivot axis 17' of the feeler arm. The bell crank lever is operatively connected on one hand with the feeler head 19, by means of a connecting link, and on the other hand with the rod 31 directly. The feeler contacts 71 and 72 are shown in Fig. 1a in closed position, due to contacting with the contact arrangement 71', 72'. If the magnetizing coil 74 is energised so that the tension magnet 73 is attracted in the direction towards the left in Fig. 1a the resulting tensile force acts upon the piston control rod 31 through the intermediary of the spring 67 via the contact lever 69 and thus on the control valve 30, in such manner, that the feeler head 19 is moved upwardly together with the feeler rollers 20 while the slide valve 30 is accordingly set. If the magnet coil 74 is not energized the tensile force exerted by the spring 68 is effective in such manner that the feeler head 19 moves downwardly together with the feeler rollers 20.

In order to limit the vertical movement of the copying slide 16, on the copying standard 15 adjustable stops 75 and 76 for cooperation with a contact lever 77 or 78 respectively are provided which cooperate with correlated stops on the copying slide. Further, on the round work supporting table 60 two cams 79, 80 providing stops are adjustably arranged for controlling a contact lever 81, which is arranged in a casing 82 situated at the base portion of this table, on the completion of a predetermined rotational movement.

Figure 3:
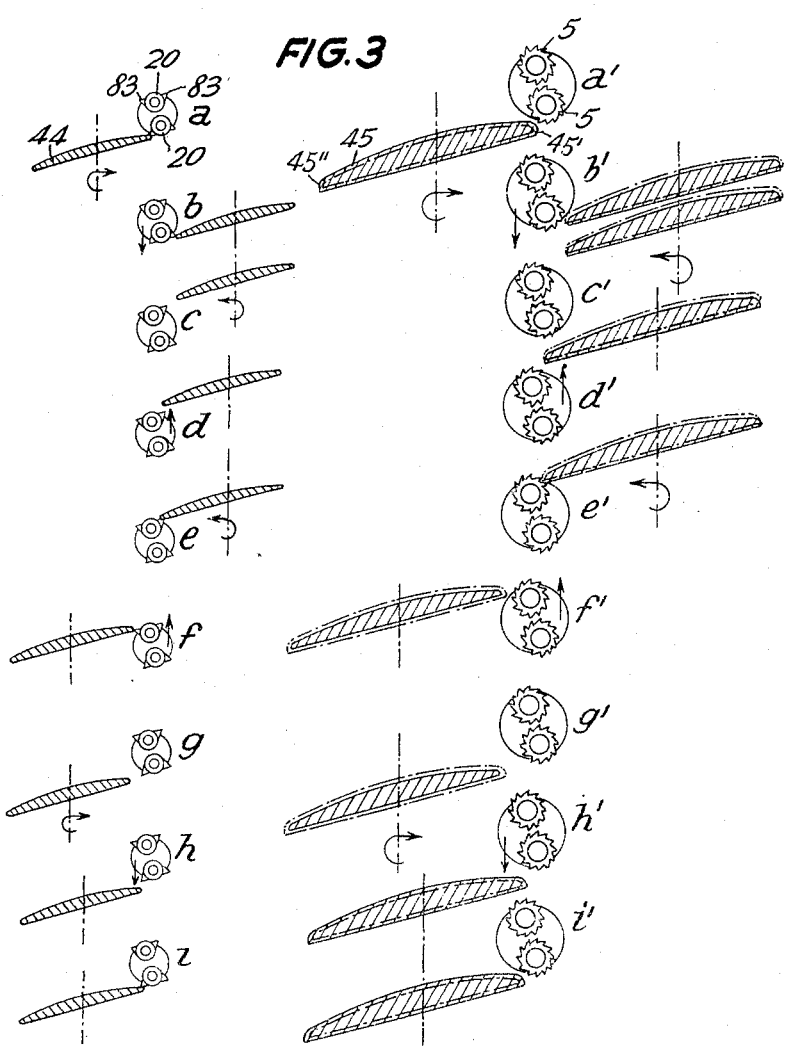
Fig. 3 represents a series of sectional views including the model and the work for illustrating the consecutive working operations performed by the model and the feeler member, that is, by the work and the tool.

In the schematic illustration of Fig. 3 showing sectional profile views, the feeler and milling cutter positions $a$ to $i$ and $a'$ to $i'$ respectively are arranged in actual sequence. The positions $a$ to $i'$ show how the feeler head 19 carrying the feeler rollers 20 is guided along the circumference of a model profile. The positions $a'$ to $i'$ show in coordination therewith how the tool works proportionately to the movement of the feeler. In order to provide for the outer leading and trailing edges 45' and 45'' of the work 45 (Fig. 3) also to be machined it is necessary to associate an auxiliary guide member 83 with the feeler rollers 20, which guide member is adjustably clamped to the pivot pins of the feeler rollers. Each auxiliary guide member serves the purpose of providing that the feeler roller 20 operating at either end of the model can slide not only across the respective leading or trailing edge, as the case may be, but can also slide to some extent beyond the respective edge. In advancing the feeler head 19 towards the model 44, first the auxiliary guide member 83 approaches on the leading edge of the model, so that the milling cutter assumes the relevant initial position relative to the work. In feeding the model or work supporting round table, respectively, the model travels towards the auxiliary guide member 83, until the feeler roller 20 begins to explore the model. The same working operation takes place but in reversed sequence, when the model separates from the feeler. By this means the result is obtained that the unequal leading or trailing configurations can be worked without the risk that damage to the milling tools may ensue, by the latter suddenly seizing on the surplus material allowed on the work. The appropriate passage of the tool round the edges thus depends upon the size of the respective peak portions of the auxiliary guide members.

The front portion 18' of the feeler arm and the arm 18 itself, that is, the milling head 4' and the milling arm 4 are fastened by means of normal machine elements, for example, headed bolts guided in T-shaped guide grooves or other clamping appliances, and are mounted on centering guide means, in such manner, that said parts 18' and 4' are angularly adjustable about the longitudinal axis of the feeler arm or the milling arm, respectively. The portion 18' of the feeler head and the feeler head 19 itself may be interlinked by means of parallel links associated with corresponding pivot pins or parallelogram guides. By this means the most suitable adjustment of the angular position of the feeler head 19 as well as that of the milling head 4 to the inclined surface of the work to be machined is obtained.

Figure 4:
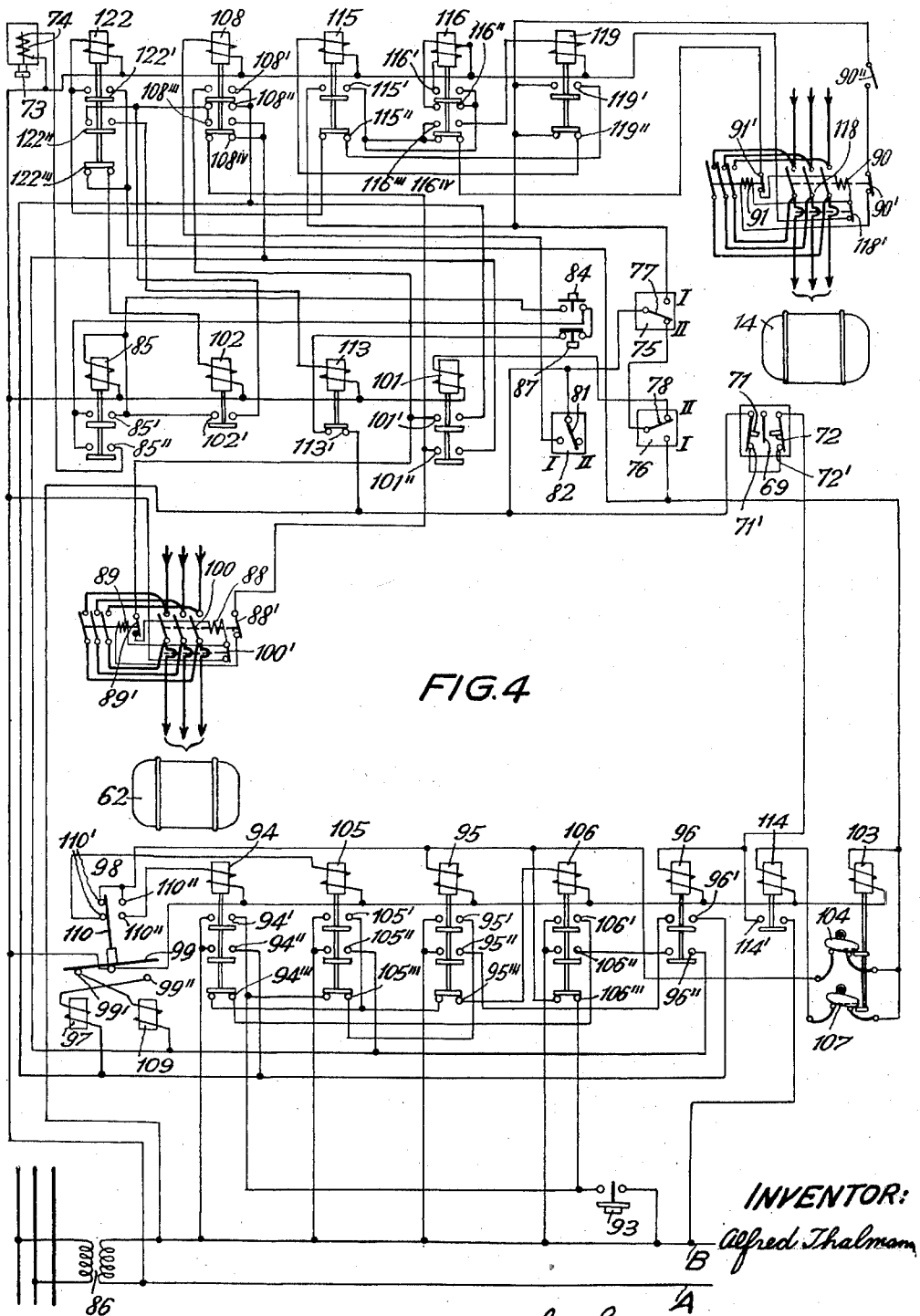
Fig. 4 illustrates a wiring diagram for the control of the electrical functioning of the device according to this invention.

In the following the functioning of the electrical control system of the automatic copying arrangement is described by having reference to the wiring diagram illustrated in Fig. 4, in which the numeral 86 designates the transformer for feeding the two control conductors A and B.

Before the beginning of working, the copying slide 16 is hydraulically raised by controlling a push button switch 84, so that the respective feeler roller 20, which has been raised together with the slide, will be situated above the model 44. This is effected in that, due to the closing of the push button operated switch 84, a relay 85 is energized through a contact 113' of a relay 113 and a closed push button operated switch 87 (Fig. 4). On opening the push button switch 84 the relay 85 remains closed over its own contact 85', the switch 87 and the contact 113' of relay 113. The magnet coil 74 becomes energized over the following circuit: conductor A, coil 74, contact 85'', switch 87, contact 113' of relay 113, conductor B. By the energisation of the magnet coil 74 the tension producing magnet 73 is attracted in the direction towards the left in Fig. 1a, the piston control rod 31 is also moved in that direction by action of the contact lever 69, as previously explained. Since the piston 30 shares in the movements of the rod 31, the pressure of the fluid discharging from conduit 33 past the face 30' of the piston 30 via the valve chamber, which is defined by the face 30' and the opposite face 30'' of the control slide valve 30, into the return conduit 35 decreases below that which is admitted to the cylinder 36 through the conduit 34 having been shut in the meantime by the piston face 30''. As the latter conduit leads into the lower portion of the cylinder 36 the piston rod 38 is hydraulically raised by virtue of the pressure difference in the two space portions S on opposite sides of the piston 37 and the copying slide 16 is also raised.

For the automatic machining of, for example, a right-handed work in accordance with an also right-handed model it is a prerequisite that the feeler member 20 is correctly adjusted to the model 44 and the milling cutter 5 is correctly adjusted to the work 45. By depressing the push button switch 87 the above mentioned circuit of the magnet coil 74 can then be interrupted, whereby the feeler member and the milling cutter are lowered until the lower feeler roller 20 is in the position relative to the model 44, as shown in $a$ of Fig. 3. As disclosed by the corresponding position $a$ in Fig. 3 the transition template 83 for the lower feeler roller 20 bears on the model 44 at the beginning of the work for facilitating the smooth initiation of the cutting operation. The milling cutter 5 is in the position which it assumes shortly before cutting into the work. When the feeler roller 20 bears on the model 44 the lowering of this roller is stopped by this bearing engagement so that the roller is then in position for being automatically displaced by action of the control rod 31, as previously explained. At the same time the feeler contact arrangement 71, 71' is connected by hand control, thereby to energise over contacts 71' and 72' a relay 96, whereupon the electrical control system for the automatic operation of the copying arrangement is in condition of operation.

The motor 7 for driving the milling cutter is started to run in the required direction of rotation, in a manner known per se, by controlling a push button switch which controls a reversing starter.

The beginning of the automatic control system is effected by closing a push button switch 93 whereby the circuit of a relay 95 is closed via a contact 106''' of a relay 106 and the switch 93. By means of a contact 95'' of the relay 95 and a contact 96' of the relay 96 the circuit through the coil 97 of a reversing relay 98 is closed when this relay has been in the position, in which contacts 99'' and 110'' are closed and the respective contact bars 99 and 110 are thus shifted towards the left hand side into the position shown in which contacts 99' and 110' are closed and serve for preparing for the next switching operation for rotating the table for feed movement towards the right hand side in Fig. 1b. A coil 88 of a reversing starter 100 is energised over the following circuit: Conductor A, contact 100', coil 88, contact 89', contact 101' of a relay 101 having been energised through the contact 77, 78, contact 96' of relay 96, contact 95'' of relay 95 to conductor B. The motor 62 is started so to run that this motor drives the two round tables 60, 61 at equal angular velocity for left hand table feed. In connection therewith the feeler roller 20 explores the upper side of the model 44 while the cutter is correspondingly controlled by the feeler.

In the position b in Fig. 3 the outer edge of the transition template 83 for the lower feeler roller 20 is situated on the left hand end of the model 44. In this condition of operation the milling cutter 5 has machined the upper side of the work 45 and has passed over the work in accordance with the feeler roller 20 (position b' in Fig. 3). As the feeler roller 20 separates from the model 44 together with the transition template 83, the contact lever 69 is so moved by influence of the spring 68 that this lever opens the feeler contact 71, whereby the circuit through the relay 96 is broken, the reversing starter 100 is disconnected and the motor 62 is stopped and so the movement of the two round tables 60, 61.

The copying slide 16 moves downward until meeting with the lower stop 76 (Fig. 1a) in position c (Fig. 3). The contact lever 78 is changed over by a stop on the slide from position II into position I. By this means the circuit through the relay 101 is interrupted and potential is impressed on a relay 102 via a contact 122''' of a relay 122 and contacts 78 and 77. Moreover, a circuit through a relay 103 is closed via contact 78 and contact 77 so that the mercury switch tubes 104, 107 are connected in circuit. By means of the switch tube 104 a circuit through a relay 105 is closed via the contacts 110' and the contact bar 110 of the reversing relay 98, whereby this relay 105 is energised so that by means of its contacts 105' and a contact 95''' of relay 95 a relay 106 is energised. Further, a relay 114 is energised via the switch tube 107 and via a contact 114' of this relay the relay 96 is energised. The following circuit is then closed: From conductor A, contact 100' connected with the reversing starter 100, coil 89 of the reversing starter 100, contact 88', contact 108$^{IV}$ of relay 108, contact 96'' of relay 96, contact 106'' of relay 106 back to conductor B.

The coil 89 is energised and the reversing starter 100 is so connected in circuit that the motor 62 rotates the work table 60 in the right hand direction in Fig. 1b. At the same time the coil 109 of the reversing relay 98 has been energised via the contacts 106'' of the relay 106 and 96'' of the relay 96, whereby the contact bar 110 has been moved to the right into the position in which the contacts 110'' are closed and which serves as a preparatory measure for the next switching operation of rotating the table, for feed movement in the left hand direction of rotation (Fig. 1b).

Due to the transmission of driving movement by the motor 62 the round tables 60, 61 rotate in the right hand direction until the starting portion of the model 44 overlaps the right hand peak of the transition template 83 for the upper feeler roller 20 for a few millimeters (position d in Fig. 3). In this position of the table the table stop 80 which is adjusted for the maximum width of the work changes over the contact lever 81 from the position II into the position I. In consequence thereof the reversing relay 108 is energised and its contacts are changed over. By the breaking of the contact 108$^{IV}$ the circuit through the coil 89 of the reversing starter 100 is interrupted and the motor 62 is stopped. Further, via the contacts 102' of the energised relay 102, the contact 108'' and the contacts 96'' and 106'' the relay 85 is energised so that the magnet coil 74 has potential impressed thereon via contact 85'', switch 87 and contact 113' of relay 113, whereby the copying slide and the working slide are raised hydraulically.

By the energisation of the magnet coil 74 also the tension magnet 73 is attracted and the feeler contact 72 is opened by the feeler lever 69 so that the circuit is broken at 72' and the motor 62 is stopped together with the round tables 60, 61.

As the copying slide separates from the lower stop 76 the contact lever 78 is rocked for changing over from position I in the upward direction back into position II, whereby the circuit through the relay 102 is interrupted and the relay 101 is energised again; at the same time the relays 96, 114 and 103 become devoid of current.

The transition template 83 for the upper feeler roller 20 in meeting with the model 44 (position e in Fig. 3) has initial movement imparted thereto in the downward direction to the right, thereby to rock the contact lever 69 about its fulcrum 70. By this means the lower end of the lever 69, which holds the contact 72 in position moves towards the left and thus clears the contact 72 so that the latter can contact with 72'. In this way relay 96 is energised again and the coil 89 of the reversing starter 100 is connected in circuit via the contacts 106'', 96'', 101'', 88', and 100' so that the reversing starter 100 starts the motor 62 which in turn starts rotating the round tables 60, 61 from left to right as indicated in Fig. 3e.

The underside of the model is then explored and the work is machined proportionately thereto by the milling cutter element until the transition template for the upper feeler roller 20 separates from the model 44 (position f in Fig. 3). At this moment contact is broken at the feeler contact 72 again due to the attraction of the tension magnet 73 and the circuit through the relay 96 is interrupted, whereby also the circuit through the coil 89 of the reversing starter 100 is interrupted, the motor 62 is disconnected and the round tables 60, 61 are set at rest.

At the same time the copying slide is raised hydraulically owing to overpressure of the pressure fluid in the lower portion of space S, due to the working operation being reversed (changing over of the machine for working the underside of the work) by the slide valve 30 having been changed over automatically until it hits the stop 75 (Fig. 1a and position g in Fig. 3). The movement limiting contact lever 77 is then rocked for moving from position II into position I. By this the relay 101 becomes devoid of current and the relay 115 is energised via contact 119'' and contact lever 77. By this energisation of the relay 115 the coil of the time relay 116 receives current over its contact 116', contact 115' and contact lever 77 and will be operated after an adjustable time of 1 to 9 seconds and the coil 90 of the reversing starter 118 has potential impressed thereon through the circuit from conductor B via movement limiting contact lever 77 in position I, contact 115' of relay 115, contact 116'' of relay 116, contact 91', coil 90 of the reversing starter 118, contacts 118' to conductor A so that this starter is connected in circuit and the motor 14 is started. As seen from Fig. 1b the motor 14 drives via a gearing contained in the gear casing 13 on one hand, by means of the pair of bevel wheels 12, the upstanding shaft 11 and the bevel wheel gear 10, the traversing spindle 8 which readjusts the milling arm 4 in the longitudinal direction of this arm. On the other hand, by the gearing in the gear casing 13 the traversing spindle is actuated, which readjusts the feeler arm 18 in accordance with the movement of the milling arm, by means of back gears 28, the shaft 27, the pair of bevel wheels 26, the upstanding shaft 25 and the bevel wheel drive 24. This position of the arms for milling and exploring corresponds to the desired width of chip and endures until the time relay 116 being adjustable from 1 to 9 seconds energises, whereupon contacts 116$^{IV}$ opens the circuit through the coil 90 of the reversing starter 118 and this starter is disconnected so that the motor 14 is stopped. On the lapse of the time as adjusted the motor control relay 119 is energised over contacts 116''' of the time relay 116 so that contact is broken at 119'', whereby the relay 115 becomes devoid of current.

The relay 122 is then connected in circuit, via the contacts 115'', 119' and contact lever 77, and a circuit through the relay 103 over contacts 122', 115'', 119' and contact lever 77 is closed, by which the mercury switch tubes 104 and 107 are connected, via the contact 122'' of the relay 122, the contact 115'' of the relay 115, the contact 119' of the motor control relay 119 and the movement limiting contact lever 77 lever in position I. By means of the switch tube 104 the contact 95 is energised, and by means of the contact bar 110 of the reversing relay 98 with said bar in the position in which contacts 99'' and 110'' are closed, a circuit for the relay 94 is closed, thereby energising this relay. Further, via the switch tube 107 the relay 114 is energised and via the contact 114' of this relay 114 the relay 96 is energised.

A circuit is then closed as follows: From conductor A, contact 100', coil 88, contact 89', contact 108' of the changing-over relay 108 and contact 94'' back to conductor B. The coil 88 is energised and the reversing relay 100 is so connected that the motor 62 begins to rotate in the direction from left to right.

The round tables 60, 61 rotate in the direction towards the left hand side until the model overlaps the peak of the left hand transition template 83 for the lower feeler roller 20 by a few millimeters (position $h$ in Fig. 3).

With the table, that is, the model in this position the table stop 79 functions to change over the contact lever 81 to the left hand side into position II. By this means the relay 108 becomes devoid of current so that the circuit through the magnet coil 88 of the reversing starter 100 is interrupted and thus the motor 62 is set at rest together with the round tables 60 and 61. Further, the relay 85 de-energizes so that the magnet coil 74 becomes devoid of current and the copying table and the working table begin to slide downwardly. As the copying slide separates from the upper stop 75 the contact lever 77 is removed from position I into position II for effecting switch control, whereby the relay 101 is energised again.

On the transition template 83 of the lower feeler roller 20 hitting the model 44 (position $i$ in Fig. 3) a further initial movement in the upward direction is effected which has the result that contact is closed at the feeler contact 71 by means of the feeler head 19, the transmission mechanism 32, the rod 31 and the contact 71. Consequently the relay 96 has potential impressed thereon and via the contacts 95'', 96'', 101', 89' and 100' the coil 88 of the reversing starter 100 is energised and the starter 100 is thus controlled again, in such manner, that the motor 62 and the round tables 60, 61 continue to rotate from right to left.

The switch control operation then repeats automatically in the manner described until this electrical control ceases by push button control or by corresponding movement limiting switch control.

By means of a manually operable switch 90'' it is possible to accomplish that via the contacts 90' and 118' of the reversing starter 118 the winding 91 has potential impresses thereon so that the motor 14 cut in switch 118, rotates in the opposite direction and that in this case the application movement of the milling and feeler arms takes place in the opposite direction.

In the following the control effected by the hydraulic copying and milling operations is described:

From a pump (not shown) pressure fluid, for example, oil is passed through conduits 33, 34 and 46, 47 into the respective control cylinders, and the copying and working cylinders. In order to permit of moving the feeler rollers 20 prior to begin working, for example, towards the model 44, it is absolutely necessary to interrupt the circuit through the magnet coil 74 by control of a push button 87 (Fig. 4) for the reason that by effort of the spring 68 operative downward movement of the feeler head 19 and the feeler roller 20 by means of contact lever 69, rod 31 and transmission mechanism 32 can be produced.

This movement being produced by the spring 68 is also transmitted to the control slide valve 30 from left to right, thereby to reduce the control port opening for the passage of pressure oil from conduit 33 to the control cylinder 29 by the left hand end face 30' of the control piston. On the contrary, the flow of oil into the upper portion of the space S of the copying cylinder 36 is enhanced and is thus applied to the piston 37 which is displaced together with the copying slide 16. The oil which is thus discharged at the rear end of the piston 37 passes through the conduit 34 communicating with the lower portion of the space S of the cylinder 36 to the return conduit 35 through the control port opening thus being enlarged by effect of the right hand end face 30'' of the control slide valve 30.

By virtue of the stressing of the spring 68, as explained in the preceding paragraph, the feeler head 19 moves downwardly, whereby the described influence on the slide valve 30 and thereby the downward movement of the copying slide is produced. As the feeler roller 20 touches the model the rod 31 begins to return, due to the movement of the feeler head 19 which results in shifting the control piston 30 from right to left, until the spring force of spring 68 is balanced and the port opening areas through which the pressure oil arriving from both conduits 33 and 34 can discharge via the slide valve 30 into the return conduit 35 and which are uncovered by the right and left hand end faces 30', 30'' of the control slide valve 30 are such that the pressure in the cylinder 36 below the piston 37 is equal to the pressure in the cylinder 36 above the piston 37 and the weight of the copying slide 16. This disposition is shown in Fig. 1$a$.

The laterally disposed control cylinder 39 is positively moved along with the moving copying slide 16 and if, as in the present instance, it is moved in the downward direction the control slide valve 40 contained in the control cylinder 39 is upwardly displaced away from its initial median position by the feeler roller 41 bearing on the rule 43 which at this time is stationary. Therefore, the oil supplied by the conduits 46 and 47 through the port opening areas available in said median position is so controlled that on one hand the lower end face 40' of the control slide valve 40 has the effect to reduce the flow of oil from the conduit 46 and on the other hand the upper end face 40" of the control slide valve end face has the effect of increasing the flow of oil from the conduit 47. The overpressure produced in the conduit 46 is thus transmitted to the upper end space of the working cylinder 49 situated above the piston 50 to be effective in this space so as to displace also the working slide 2 together with the piston 50. The oil discharging at the rear end face of the piston 50 passes into the return conduit 48 through the conduit 47 communicating with the lower end space of the working cylinder 49 and the precedingly described enlarged port opening in the control cylinder 39.

Therefore the cutter slide 2 also shifts downward, together with the rack 59 depending therefrom, proportionately to the movements of the copying slide, by the action of the piston 50. The gear 58 meshing with the rack 59 transmits the vertical movement of the working slide 2 via shaft 57, bevel wheel drive 56 and back gears 55, 54 to the rack 52, whereby the guide slide 53 is moved horizontally from right to left together with the obliquely adjusted rule 43 being screwed to said slide. In connection therewith the control slide valve 40 is moved downwardly by the feeler roller 41 then bearing against the rule 43 under the influence of the spring 42 until the upper and lower end faces 40" and 40' of the control slide valve 40 have again uncovered control port areas of such size that the pressure in the cylinder 49 below the piston 50 is equal to the pressure in the cylinder 49 above the piston 50 plus the weight of the working slide 2. Pressure oil can now discharge into the return conduit 48 from both conduits 46 and 47.

From the preceding description it follows clearly how the quiescent round tables can remain in median position whilst one of the feeler rollers 20 bears on the model 44 and the other feeler roller 41 bears on the obliquely adjusted rule 43 so that the pressure oil supplied by the pump can maintain the respective pistons 37 and 50 and consequently the copying and working slides at rest. Only while the round tables rotate, the above-mentioned control slide valves are correspondingly displaced by virtue of which the pressure oil effects the vertical movement of the copying and working slides in one or the other direction.

The obliquely adjustable rule 43 permits of producing works of smaller or greater size by means of one and the same model. The back gears 54, 55 are instrumental in obtaining this result, one of which being in mesh with the rack 52 secured to the guide slide 53 and the other being operatively connected with the bevel wheel drive 56 which cooperates via the shaft 57 with the spur gear 58 which intermeshes with the rack 59 secured to the working slide 2. Dependent upon the numbers of gear teeth chosen for the back gears 54, 55 and the respective adjustment of a predetermined angle of inclination of the rule 43, any desired ratio of copying between the model 44 and the work 45, measured in the axial direction, can be obtained.

In order to obtain the same result in applying the feeler and milling arms in the radial direction at the same copying ratio, either the number of gear teeth of the back gears 28 is to be correspondingly varied or an infinitely variable change speed gear (not shown) is to be provided between the driving elements of the feeler and milling arms.

The angular velocities of the two rotatable tables 60, 61 remain constant. Variation of these would, if at the same time the ratio of the vertical copying relation between the feeler and the milling arm were changed, result in disproportionate ascending in respect of the circumferential velocity. The ratio of length of diameter between the model and the work defines at the same time the radial speed relation between the travels of exploration and milling, as obtained, exactly proportional to the inclined path, as adjusted.

Figure 2:
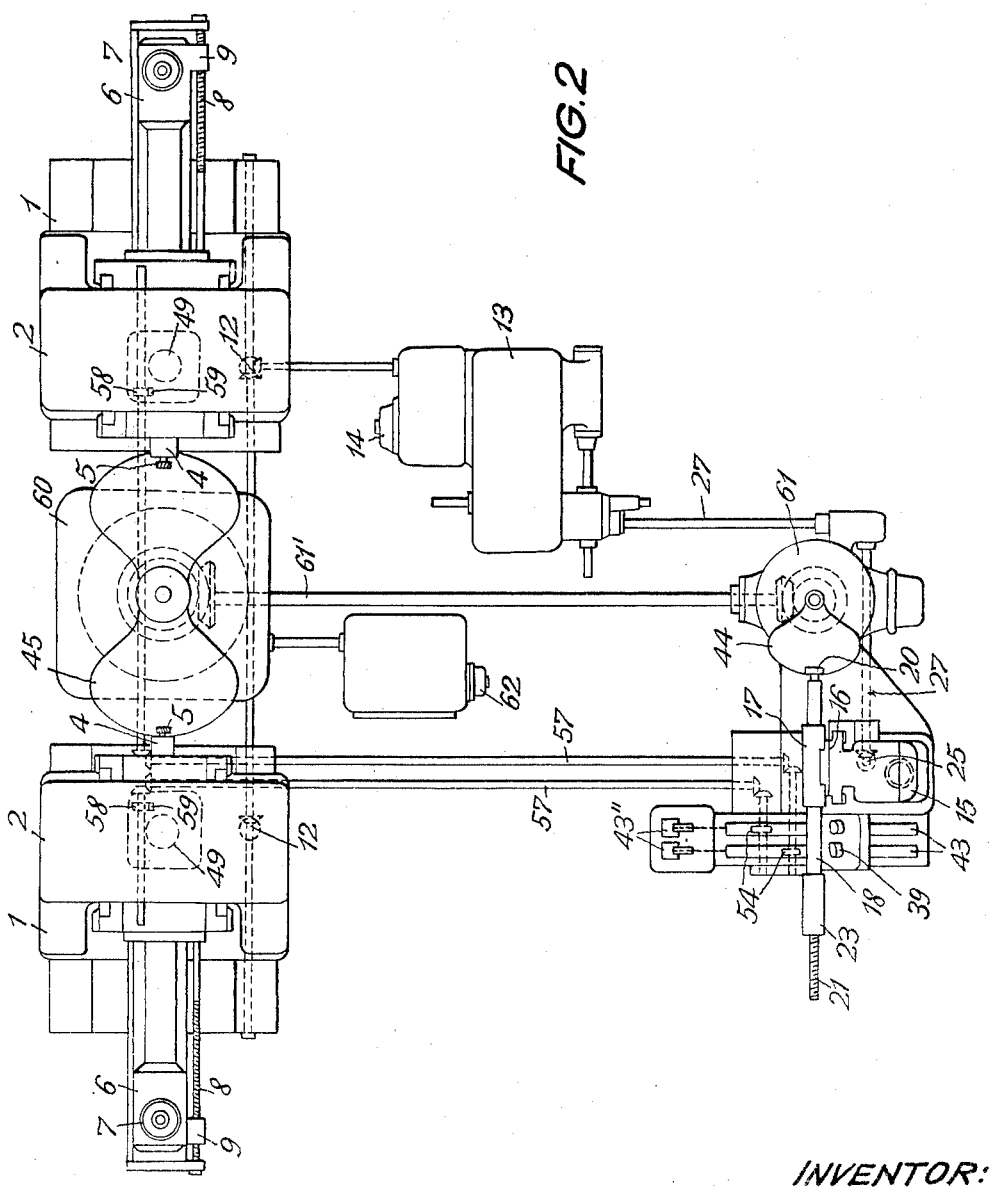
Fig. 2 is a smaller scale plan view of a modified device, according to this invention, with certain parts omitted, the device including two working standards.

The device according to this invention can be modified by being equipped with two or more working standards 1. A modified device equipped with two working standards is shown in plan in Fig. 2. In view of the milling with such a device provision is made that at each individual working standard 1 the working slide 2 is controlled by a pressure oil operated piston 49 in a cylinder 50. For such a hydraulic control system two or more control cylinders 39 and quite as many feeler members 41 are provided on the common copying slide 16. The same applies also to the number in which all the transmission mechanisms 43, 54, 57, 58, 59 (two or more and so forth) are to be provided such as are used on one hand for the actuation of a single working slide 2 for operation in the vertical direction and on other hand also for the application of the milling arm 4 to the work 45 in the cross direction. The rules 43 are counterbalanced by weights 43". The control operations are initiated by the copying movements effected by the copying slide 16, due to the exploring of the model 44 by the feeler roller 20. Therefore with this apparatus two workpieces are machined at the same time, the working operation being controlled by means of a single feeler member 20 in conjunction with a single model.

For the machining of small blades, advantageously, instead of two milling cutters only a single milling cutter and a feeler with a single feeler member are provided.

I claim:

1. Apparatus for the automatic machining of flat work pieces comprising in combination, means for reciprocating a workpiece in synchronism with a flat model of any feasible surface configuration in horizontal arcuate throws about an axis through the base of the work, feedable tool means for machining said work, a single tool carrier arm displaceable longitudinally of the work corresponding to the tool feed and adapted to be pivotally adjusted towards said work and to be movable vertically, a pivotal feeler arm, carrying feeler means and advancing like said tool arm, to explore said model for proportionately transmitting its exploring movement to said tool, auxiliary guide means associated with the feeler means to enable machining a work edge successive to machining a work side by said tool, a pressure fluid transmission system operatively connected with said tool means and said feeler means for controlling automatically the movement of the said tool means in accordance with the movement of the feeler means and electrically operated control means for causing the tool to travel around the work piece during the working and to machine both sides of the work piece by means of the single tool carrier arm.

2. Apparatus for the automatic machining of flat work pieces comprising in combination, means for reciprocating work pieces in synchronism with a common flat model of any feasible surface configuration in horizontal arcuate throws about an axis through the base of the work, separate feedable tool means for machining each said works, a separate single tool carrier arm displaceable longitudinally of the works corresponding to the respective tool feed and adapted to be pivotally adjusted towards the said works and to be movable vertically, a pivotal feeler arm, carrying feeler means and advancing like said tool arm, to explore said model for proportionately transmitting its exploring movement to said tools, auxiliary guide means associated with the feeler means to enable machining a work edge successive to machining a work side, by the respective said tools, a pressure fluid transmission system operatively connected with said tool means and said feeler means for simultaneously controlling automatically the movement of the said tool means in accordance with the movement of the feeler means and electrically operated control means for causing the tool to travel around the work piece during the working and to machine both sides of the work piece by means of the single tool carrier arm.

3. Apparatus for the automatic machining of flat work pieces comprising in combination, means for reciprocating a work piece in synchronism with a flat model of any feasible surface configuration in horizontal arcuate throws about an axis through the base of the work, feedable tool means for machining said work, a single tool carrier arm displaceable longitudinally of the work corresponding to the tool feed, and adapted to be pivotally adjusted towards said work and to be movable vertically, a pivotal feeler arm, carrying feeler means and advancing like said tool arm, to explore said model for proportionately transmitting its exploring movement to said tool, auxiliary guide means associated with the feeler means to enable machining a work edge successive to machining a work side by said tool, a pressure fluid transmission system operatively connected with said tool means and said feeler means for controlling automatically the movement of the said tool means in accordance with the movement of the feeler means, exchangeable ratio altering means associated with said transmission system for infinitely varying the ratio of transmission of the exploring movement to said tool for accordingly varying the relative size between said model and said work and electrically operated control means for causing the tool to travel around the work piece during the working and to machine both sides of the work piece by means of the single tool carrier arm.

4. Apparatus for the automatic machining of flat work pieces comprising in combination, means for reciprocating a work piece in synchronism with a flat model of any feasible surface configuration in horizontal arcuate throws about an axis through the base of the work, a separate supporting table for said work and for said model for reciprocating the last named parts in horizontal arcuate throws, feedable tool means for machining said work, a single tool carrier arm displaceable longitudinally of the work corresponding to the tool feed and adapted to be pivotally adjusted towards said work and to be movable vertically, a pivotal feeler arm, carrying feeler means and advancing like said tool arm, to explore said model for proportionately transmitting its exploring movement to said tool, auxiliary guide means associated with the feeler means to enable machining a work edge successive to machining a work side by said tool, a pressure fluid transmission system operatively connected with said tool means and said feeler means for controlling automatically the movement of the said tool means in accordance with the movement of the feeler means, a reversing gearing interposed between said tables for reversing the rotational movement of one of said tables relative to that of the other table, for producing right-handed or left-handed works and electrically operated control means for causing the tool to travel around the work piece during the working and to machine both sides of the work piece by means of the single tool carrier arm.

5. Apparatus for the automatic machining of flat work pieces comprising in combination, means for reciprocating works having a topside and an underside in synchronism with a flat model of any feasible surface configuration in horizontal arcuate throws about an axis through the base of the work, a pair of tools for machining each said works, a single tool carrier arm displaceable longitudinally of each said works, corresponding to the respective tool feed and adapted to be pivotally adjusted towards said works and to be movable vertically, two pivotal feeler arms carrying feeler means advancing like said tool arms to explore the relevant sides of said model for proportionately transmitting their exploring movement to the respective tool of said pair, auxiliary guide means associated with the feeler means to enable machining a work edge successive to machining a work side, by the respective said tools, a pressure fluid transmission system operatively connected with said tool means and said feeler means for simultaneously controlling automatically the movement of the said tool means in accordance with the movement of the feeler means and electrically operated control means for causing the tool to travel around the work piece during the working and to machine both sides of the work piece by means of the single tool carrier arm.

6. Apparatus for the automatic machining of flat work pieces comprising in combination, means for reciprocating works having a top side and an underside in synchronism with a flat model of any feasible surface configuration in horizontal arcuate throws about an axis through the base of the work, a pair of tools for machining each said works, said works having entrance and exit edges for the respective said tools to move across in machining the work edges, a single tool carrier arm displaceable longitudinally of each said works corresponding to the respective tool feed and adapted to be pivotally adjusted towards said works and to be movable vertically, two pivotal feeler arms carrying feeler means advancing like said tool arms to explore the relevant sides of said model for proportionately transmitting their exploring movement to the respective tool of said pair, transition templates associated with said feeler means to enable machining a work edge by means of said templates successive to machining a work side, said templates permitting said tool means to machine said work edges on said works by action of corresponding movement performed by said feeler means under control of said templates, a pressure fluid transmission system operatively connected with said tool means and said feeler means for simultaneously controlling automatically the movement of the said tool means in accordance with the movement of the feeler means and electrically operated control means for causing the tool to travel around the work piece during the working and to machine both sides of the work piece by means of the single tool carrier arm.

7. Apparatus for the automatic machining of flat work pieces comprising in combination, means for reciprocating a work piece in synchronism with a flat model of any feasible surface configuration in horizontal arcuate throws about an axis through the base of the work, feedable tool means for machining said work, a single tool carrier arm displaceable longitudinally of the work corresponding to the tool feed and adapted to be pivotally adjusted towards said work and to be movable vertically, a copying slide, a pivotal feeler arm, carrying feeler means and supported by said copying slide, advancing like said tool arm to explore said model for proportionately transmitting its exploring movement to said tool, a slide valve, a contact lever, said slide valve and said contact lever arranged in said feeler arm and operatively connected with said feeler means, for controlling said slide in accordance with the exploring movement by said feeler means and transmitting said movement to said tool, and electrical means for starting and stopping respectively said reciprocatory movements performed by said work and said model at the beginning and end respectively of machining a work side for causing the tool to travel around the work piece during the working and to machine both sides of the work piece by means of the single tool carrier arm.

8. Apparatus for the automatic machining of flat work pieces comprising in combination, means for reciprocating a work piece in synchronism with a flat model of any feasible surface configuration in horizontal arcuate throws about an axis through the base of the work, a separate supporting table for said work and for said model for reciprocating the last named parts in horizontal arcuate throws, feedable tool means for machining said work, a single tool carrier arm displaceable longitudinally of the work corresponding to the tool feed and adapted to be pivotally adjusted towards said work and to be movable vertically, a copying slide, a pivotal feeler arm, carrying feeler means and supported by said copying slide, advancing like said tool arm to explore said model for proportionately transmitting its exploring movement to said tool, a slide valve, a contact lever, said slide valve and said contact lever arranged in said feeler arm and operatively connected with said feeler means for controlling said slide in accordance with the exploring movement of said feeler means, electrical means for connecting and disconnecting respectively said reciprocatory movements performed by said tables at the beginning and end respectively of machining a work side, stop means on said copying slide, further contact levers for cooperation with said stop means for connecting certain said circuits for starting said reciprocatory table movements, and adjustable stop means on said tables for cooperation with a change-over lever on said tables for disconnecting certain said conduits, for stopping said work and said model, the whole for causing the tool to travel around the work piece during the working and to machine both sides of the work piece by means of the single tool carrier arm.

ALFRED THALMANN.

REFERENCES CITED

The following references are of record in the file of this patent:

UNITED STATES PATENTS

| Number | Name | Date |
|---|---|---|
| 2,204,696 | Ratie | June 18, 1940 |
| 2,345,116 | Hanna | Mar. 28, 1944 |
| 2,397,108 | Hanna | Mar. 26, 1946 |
| 2,424,031 | Heer | July 15, 1947 |